UNITED STATES PATENT OFFICE.

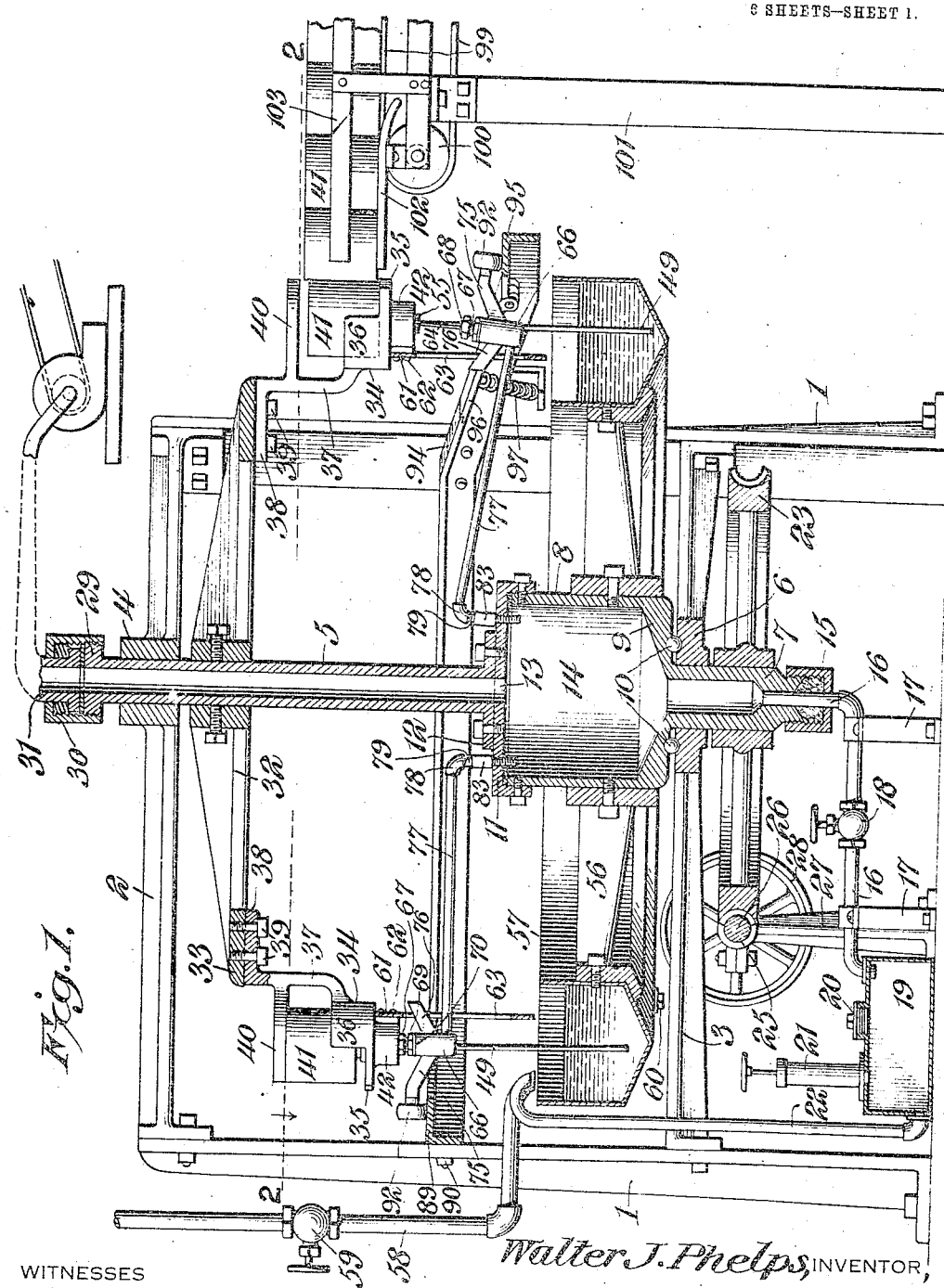

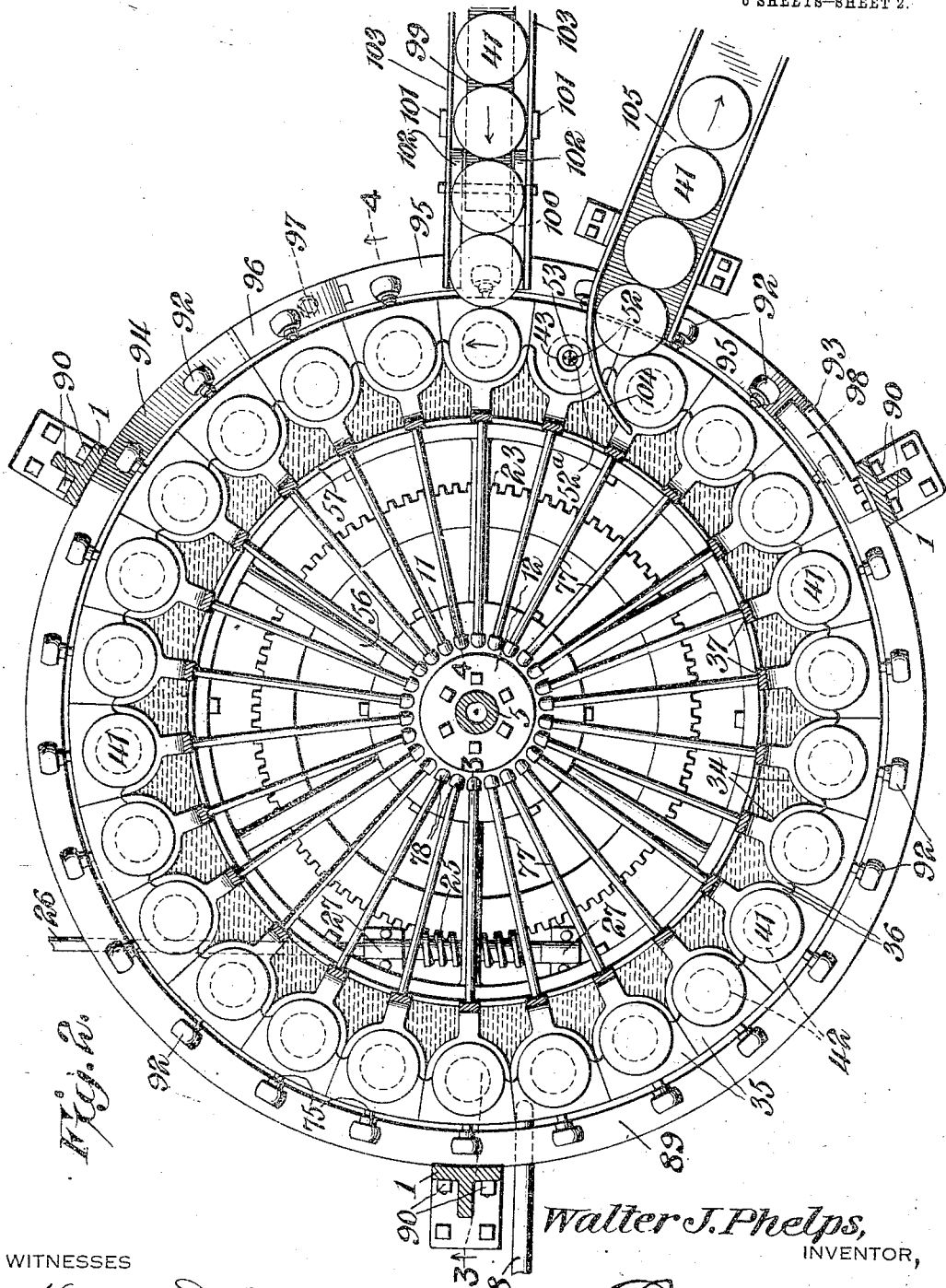

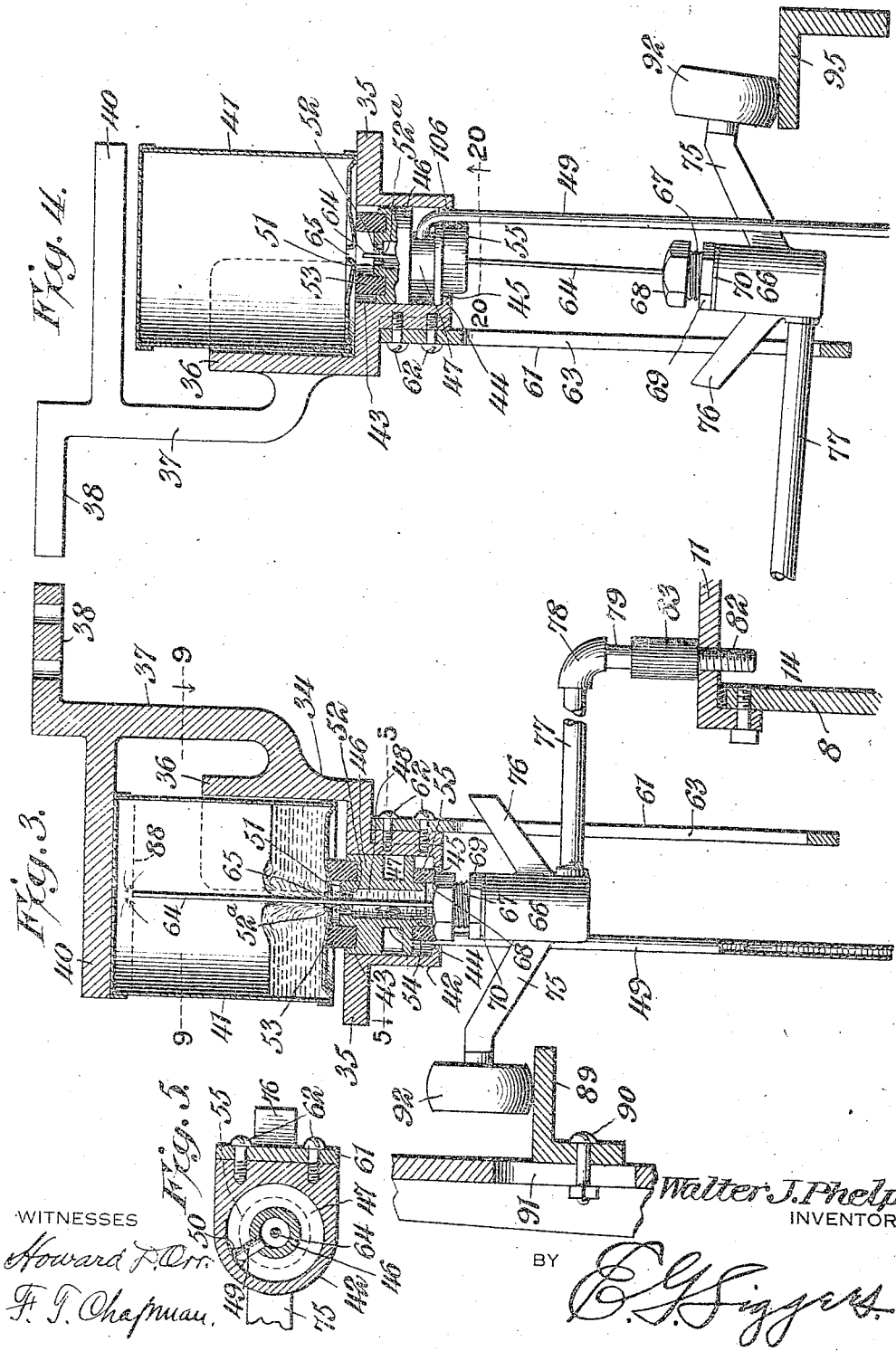

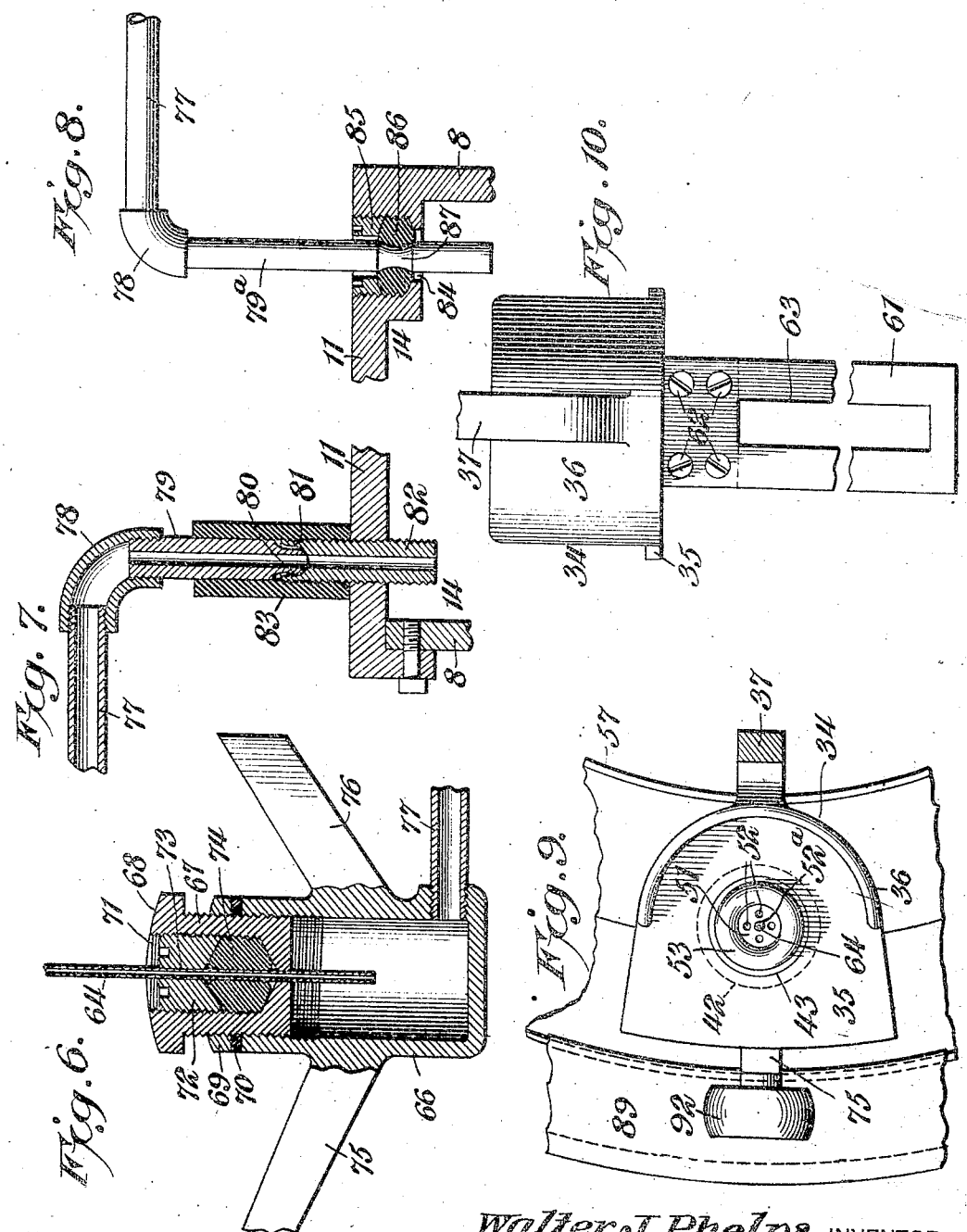

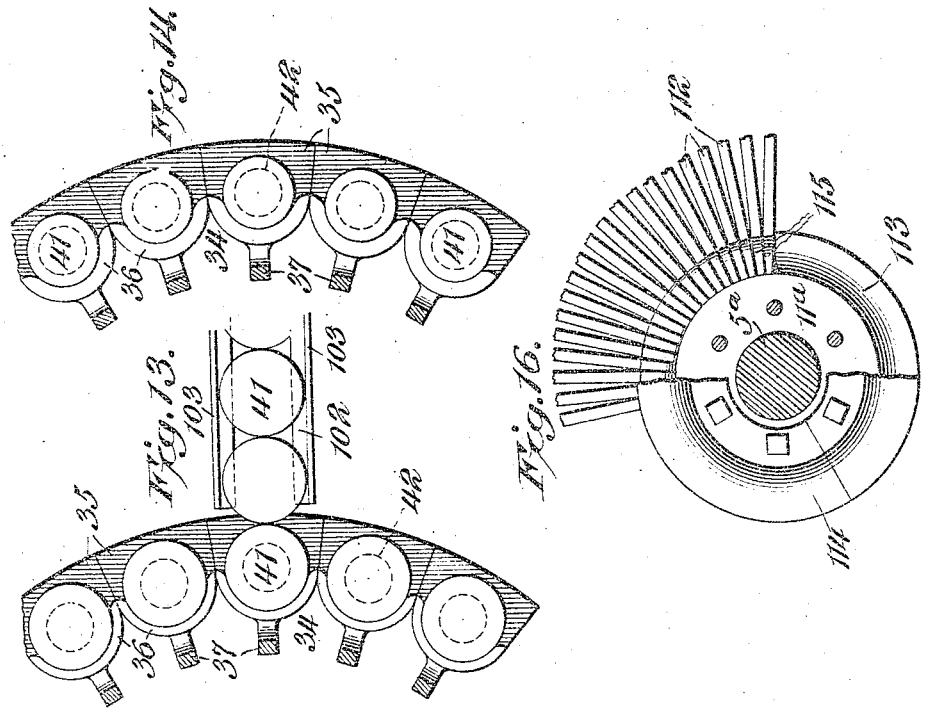
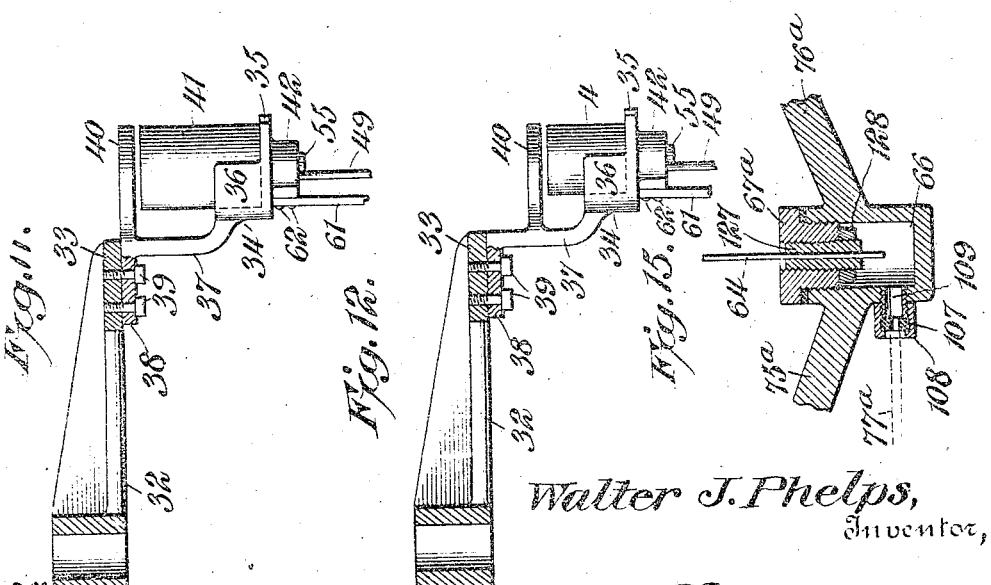

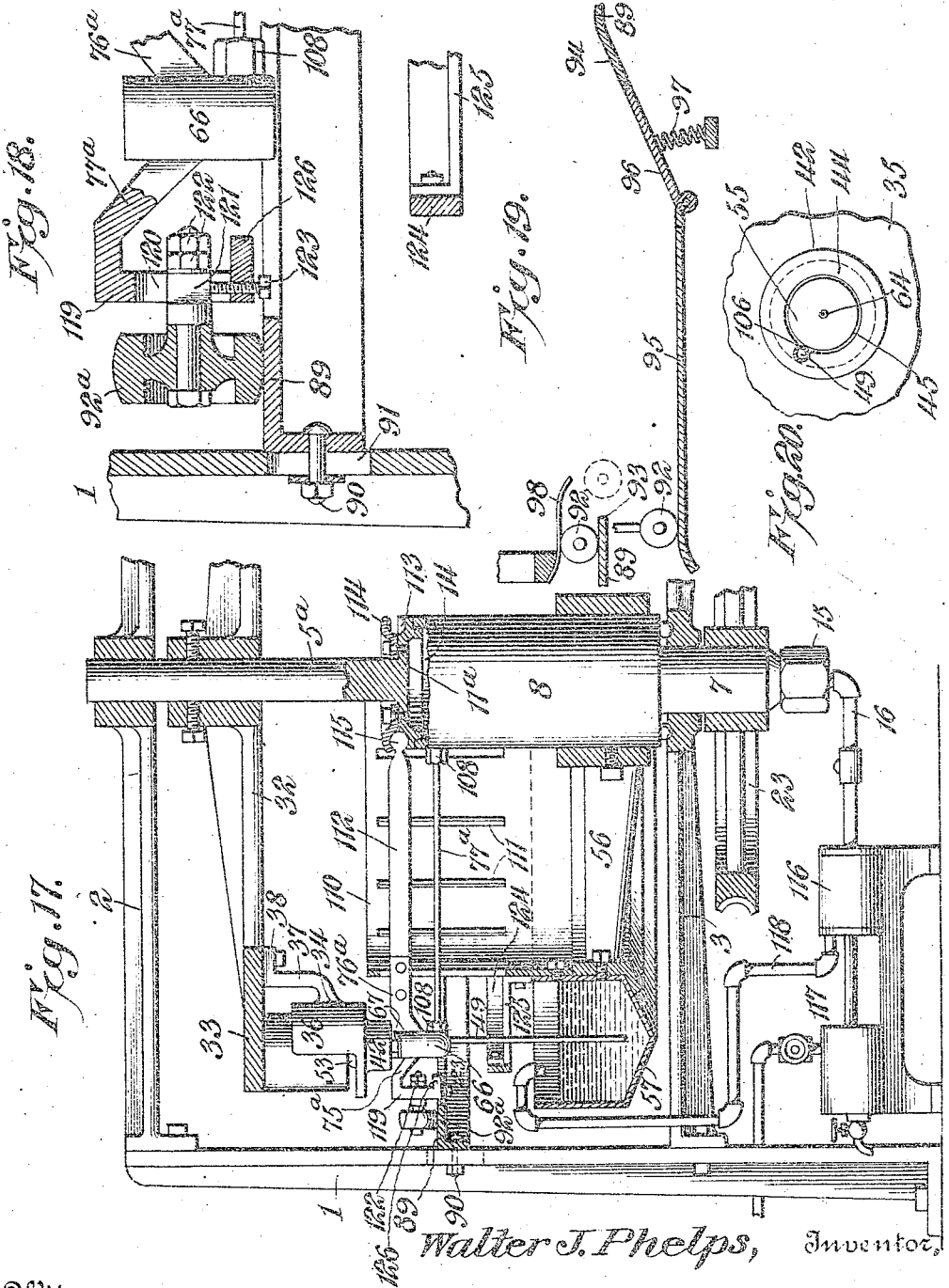

WALTER J. PHELPS, OF BALTIMORE, MARYLAND, ASSIGNOR OF ONE-HALF TO FRANK GEBBIE, OF ROCHESTER, NEW YORK.

CAN-FILLING MACHINE.

1,058,096.  Specification of Letters Patent.  Patented Apr. 8, 1913.

Application filed December 9, 1911. Serial No. 664,829.

*To all whom it may concern:*

Be it known that I, WALTER J. PHELPS, a citizen of the United States, residing at Baltimore, State of Maryland, have invented a new and useful Can-Filling Machine, of which the following is a specification.

This invention has reference to improvements in can filling machines, and is designed for the filling of cans with liquid through a single small perforation in one end of each can when the can is in an inverted position, that is, with the end or head having the single small perforation lowermost.

While the machine is adapted to fill cans with different kinds of liquids, it has especial adaptability for filling cans with milk in the form known as evaporated milk where the milk is considerably thickened by driving off a large proportion of the water naturally found in the milk, the resultant product being, therefore, of a thicker consistency than normal milk.

It is found advantageous to prepare the cans into which the milk is to be introduced, such cans being customarily tin cans, with both heads in place and the can completely sealed with the exception of a single small central perforation in one head, such perforation approximating one-tenth or one-eleventh of an inch more or less in diameter thereby facilitating the final sealing with a minimum quantity of solder without liability of the solder flowing through the opening and dropping into the can. This manner of sealing the cans has been found in practice to be highly advantageous in the matter of rapidity of sealing, certainty of sealing, and economy in the use of solder.

It has been proposed to fill cans of the character described with evaporated milk by introducing the milk through a small tube of a size and so located as to enter the small perforation when uppermost and still leave room about the tube for the escape of air from the can as the milk flows thereinto. This has been found to be open to objection because of the liability of foaming the milk if sufficient force be applied to cause the filling of the cans within a reasonable time, and moreover, there is a liability of depositing a quantity of the milk about the filling opening so as to require the cleansing of the top of the can before the solder can be applied.

In order to overcome the liability of foaming the milk while still obtaining a rapid inflow of the milk into the can, a method has been devised by me which consists in filling the cans while in an inverted position, whereby the inflowing milk must pass through the body of milk already in the can so that no distinct stream of milk can be formed, for the milk, though entering the can with the requisite rapidity, spreads out therein toward the sides of the can under the action of milk already within the can, this condition arising almost immediately after the filling operation begins. To accomplish the filling of the cans while in the inverted position I have devised two modes of operation, one consisting in feeding the milk to the small perforation under superatmospheric pressure while the air entrapped within the can because of its inverted position is allowed to flow out through a small tube from what in the filling operation constitutes the upper end of the can, such end of the can being imperforate. This mode of filling the can is disclosed in my application Serial No. 634,052, filed June 19, 1911, for can filling apparatus. The other mode of filling the cans while in the inverted position through the small filling perforation consists in withdrawing the air from the upper or imperforate end of the can by suction or the production of subatmospheric pressure therein, while the milk is forced into the can around the suction tube by the action of atmospheric pressure due to the production of subatmospheric pressure within the can. This second mode of filling the cans is disclosed in my application filed June 19, 1911, Serial No. 634,051, for can filling apparatus. It is to this second mode of filling the cans that the present invention particularly relates.

In accordance with the present invention there is provided, in a machine of commercial capacity, a rotatable carrier for the cans to be filled upon which the cans are placed in the inverted position, that is, with the perforated ends of the cans downward and the imperforate ends upward. Each can may have an individual support and related to this support is an air tube of minute diameter, being commonly about one-thirtieth of an inch internal diameter, although the invention is by no means limited to such specific diameter. The can support or carrier is provided with a can engaging member having a passage therethrough and so arranged that when brought against the perforated can head there is produced an air tight junction about the perforation in the can, and this can engaging member has means whereby milk from a supply thereof may be directed to the small perforation in the can. Each air tube is provided with a carrier individual thereto and there are means for operating the air tube in a manner to introduce it into the can through the small perforation until the open end of the tube is close to the imperforate end of the can, while the other end of the tube is connected to a means whereby sub-atmospheric pressure may be produced within the small air tube to exhaust the air from the can at the imperforate end thereof, wherefore atmospheric pressure exerted upon the supply of milk will force the milk through the milk tube to the small perforation in the can and through the latter into the can.

The present invention together with certain advantages possessed by the structure of the present invention will be best understood from a consideration of the following detailed description, taken in connection with the accompanying drawings forming a part of this specification, with the understanding that while in the drawings there is shown a practical embodiment of the invention, the latter is susceptible of various changes and modifications, wherefore the invention is not limited to any strict conformity with the showing of the drawings but may be variously embodied, so long as the salient features of the invention are retained and the result sought is obtained.

In the drawings:—Figure 1 is a central vertical section through a machine constructed in accordance with the present invention with some parts shown in elevation and distant can supports and parts individual thereto omitted and the relative diameter of the machine reduced for the sake of clearness of illustration. Fig. 2 is a section on the line 2—2 of Fig. 1. Fig. 3 is a detail section on an enlarged scale on the line 3—3 of Fig. 2. Fig. 4 is a section on the line 4—4 of Fig. 2 on a scale like that of Fig. 3. Fig. 5 is a section on the line 5—5 of Fig. 3. Fig. 6 is a section on an enlarged scale through one of the carriers or supports for the can-entering exhaust tubes. Fig. 7 is a section through one of the air exhaust conduits where entering the common exhaust chamber. Fig. 8 is a section of a modified form of the structure shown in Fig. 7. Fig. 9 is a section on the line 9—9 of Fig. 3 with the can omitted but showing a portion of the milk reservoir. Fig. 10 is an elevation of the can support or basket as viewed from the right hand side of Fig. 9. Figs. 11 and 12 are detail views showing forms of individual can supports or baskets which may be employed to render the machine interchangeable for cans of different sizes. Figs. 13 and 14 are plan views, partly in section, of groups of individual can supports or baskets for cans of different sizes as illustrated in Figs. 11 and 12, respectively. Fig. 15 is a detail section showing a modified means for supporting one of the small air tubes. Fig. 16 is a detail plan view with parts in section showing the manner of pivotally supporting rock arms designed to carry the exhaust air tubes and constituting a modification of the structure shown in Fig. 1 and associated figures. Fig. 17 is a section similar to the left-hand side of Fig. 1 showing a modified form of structure including the structure shown in Fig. 16. Fig. 18 is an enlarged sectional view showing adjustable parts which may be employed both in the forms shown in Fig. 17 and Fig. 1. Fig. 19 is a view, partly displayed, illustrating a portion of the cam track. Fig. 20 is a section on the line 20—20 of Fig. 4.

Referring to the drawings there is shown a frame comprising uprights 1 and connecting spiders 2, 3, respectively, and these parts may be made of web and flange construction for strength and lightness, but it will be understood that any suitable frame construction may be employed.

The spider 2 is formed with a bearing 4 for a hollow shaft 5 and the spider 3 is formed with a bearing 6 for a neck 7 formed on one end of a cylinder 8 which in practice is upright and at the lower end is formed with a head 9 from which the neck 7 projects, and in the outer wall of this head, and also in the upper face of the bearing 6 there are formed ball races for anti-friction supporting balls 10.

The upper end of the cylinder 8 is closed by a head 11 which may be made separate from the cylinder and secured thereto in any suitable manner, while the lower end of the shaft 5 is provided with a radial flange 12 by means of which the shaft is secured fixedly to the head 11, and the interior of the shaft communicates with the interior of the cylinder 8 by a passage 13 through the head 11, the cylinder 8 inclosing a chamber 14 of appropriate size, and this chamber in turn communicates through the head 9 with the interior of the neck 7. Applied to the lower end of the neck 7 is a packing gland 15 through which extends a pipe 16 communicating with the interior of the neck and exterior thereto supported upon brackets 17 or other suitable means. This pipe 16 is provided with a cut-off valve 18 and at the end remote from the neck 7 enters a closed tank 19 which may be conveniently located at any suitable point, as upon the floor or other support upon which the machine is erected. The interior of the tank 19 is accessible through a suitable opening ordinarily closed air tight by a plug 20, and communicating with the interior of the tank is an air force-pump 21, while leading from the tank near the bottom thereof is a pipe 22 hereinafter referred to. The packing gland 15 permits the rotation of the neck 7, while the pipe 16 is held against rotation, and at the same time prevents leakage at the junction.

Fast on the neck 7 is a worm gear wheel 23 driven by a worm 25 on a shaft 26 journaled on columns 27 erected on the floor or other support for the machine, and this shaft is provided with a pulley 28 whereby power may be applied to the shaft through the pulley 28 by means of a suitable belt. It will be understood, of course, that the pulley 28 may be considered as typical of any source of driving power, such, for instance, as a direct connected electric motor. By means of the indicated or other driving gear rotative movement is imparted to the neck 7, cylinder 8 and shaft 5 and parts carried thereby, which parts are hereinafter described. The upper end of the shaft 5 is formed with a flange 29 carrying a packing gland 30 engaging the flanged end of a pipe 31, which latter may remain stationary while the shaft 5 rotates, and this provides means whereby any suitable air exhausting apparatus may be connected to the interior of the hollow shaft 5 and through the latter to the chamber 14.

Mounted on the shaft 5 is a spider 32 terminating in a peripheral ring 33 to which is secured a circular series of individual can baskets 34, each comprising a plate-like member 35 having at one side a curved guard 36 which may be formed in one piece with the plate 35, and this guard has formed thereon a bracket 37 having at the end remote from the guard an angle lip 38 designed to be traversed by one or more bolts 39 by means of which the can basket is secured to the spider 32. The plates 35 may be, and preferably are, substantially segmental, so that the peripheral edge of the series of can supports is substantially continuous and concentric with the axis of rotation.

Cans for the reception of evaporated milk wherein the milk is introduced through a single small perforation in one end of the can are customarily of three practically standard sizes and are known as baby cans, family cans, and tall cans, respectively.

The plate 35 should at all times have a substantially constant position with respect to its height above other parts of the machine, but the height of the cans to be filled with milk may vary considerably. In Fig. 1 each can is received upon a plate 35 and then in the subsequent operation of the machine is elevated a short distance until its movement is arrested by engagement with a stop or abutment, although the ring 33 if sufficiently extensive as in Fig. 17 will serve as a stop or abutment, but to adapt the machine to cans of different heights and diameters there are provided the means illustrated in Figs. 11 to 14, where each bracket 37 has projecting therefrom on the side opposite the lip 38 a plate 40 constituting a stop or abutment and so related to the plate 35 that a can such as indicated at 41 may be received upon the plate 35 and subsequently elevated to be arrested after a limited elevating movement by engagement with the plate 40, the elevating movement being practically the same for the cans of different heights, since the plate 40 is formed nearer to or farther from the plate 35 in accordance with the can to be utilized. So far as the baskets, carriers or holders for the cans are concerned, the machine is quickly adapted for any chosen size of can, by changing the can baskets which may be accomplished by simply removing the screws 39, the holes through the lips 38 and in the ring 33 for the screws being the same with all can baskets, and the can baskets for the different sizes of cans being all so related that the perforated ends of the cans when on the baskets will have the same relative position with respect to the other operating parts of the mechanism. Since the smaller cans are of less diameter than the larger cans, the guards 36 for the small cans are made thicker than the guards 36 for the larger cans, or are otherwise arranged to position the perforations in the ends of the small cans into the same relation to the supports 35 as those of the larger cans.

Each plate or table 35 is formed on the face remote from that designed to receive a can with a neck 42, the interior walls of which match an opening 43 through the plate or table 35, while that end of the neck 42 remote from the table 35 may be formed with an inturned flange 44 of small radial extent, leaving a passage 45 through the said end of the neck. When the machine is installed the brackets 37 are in depending relation to the supporting spider 32 and the plates 35 are approximately horizontal and below the spider 32, while the necks 42 are in depending relation to the plates 35.

Lodged within each neck 42 is a block 46 preferably cylindrical in outline, the interior of the neck 42 being also cylindrical, although both the neck and the block may be otherwise shaped. At an intermediate point the block 46 is formed with a circular groove 47 and extending axially through the block is a passage 48. Entering the passage 48 through the groove 47 is a pipe 49 appropriately bent so as to extend through a notch 50 in one side of the block, and from thence in parallel relation to the longitudinal axis of the block for an appropriate distance for a purpose to be described. The passage 48 at one end is partially closed by a web 51 through which there is formed a circular series of passages 52 and also another passage 52ª central to the passages 52, and this portion of the block formed with the web 51 may project axially to a greater extent than the corresponding end of the block, which end is formed about the raised portion containing the passages 52 with a circular groove in which is lodged a ring-shaped gasket 53 sufficiently long to project in the direction of the longitudinal axis of the block to a greater extent than the projecting portion carrying the web 51. The other end of the block is formed with an annular flange 54 concentric with the longitudinal axis of the block, and this flange carries a ring gasket 55 extending axially to a greater distance than the flange 54, but the diameter of this gasket is such that it will extend through the passage 45 when the corresponding end of the block 46 is resting upon the flange 44 and the parts are so proportioned that when the block 46 is in the last named position the gasket 53 will be flush with or slightly lower than the upper surface of the plate 35, wherefore a can 41 may be deposited on the plate or table 35 without interference from any projecting parts.

Fast to the cylinder 8 is a spider 56 at a point considerably below the upper end of the cylinder 8 and the lower ends of the individual supports or tables 35. This spider at its periphery carries an annular trough 57 which may be made of suitable material, the trough being preferably shaped with parallel sides and a bottom declining toward a central point with respect to the two sides. The trough 57 is designed to contain a suitable quantity of evaporated milk and the pipes 49 are all of a length to dip into the trough to a point near the bottom thereof, so that the lower ends of the pipes are always immersed in the milk, the supply of milk in the trough 57 being maintained by means of a pipe 58 coming from any suitable source of supply, and containing a valve 59 which may be opened from time to time by an attendant, or may be opened to such an extent as to maintain the level of milk in the trough at an appropriate height. Since it is necessary in machines of this character to observe the utmost cleanliness and to thoroughly sterilize all parts with which milk may contact, the trough 57 is provided at a low point with an outlet normally closed by a plug 60 so that the trough may be drained preparatory to cleansing whenever necessary.

Each neck 42 has depending therefrom on the same side of the basket as the bracket 37, a plate 61 preferably made separately from the basket and secured thereto by screws 62 or otherwise, but it will be understood that this plate may be made in one piece with the basket, although for manufacturing reasons it is desirable that it be a separate structure and secured to the basket. The plate 61 is formed with a longitudinal slot 63 for a purpose which will presently appear.

Adapted to the passage 52ª is a tube 64 of a diameter to readily traverse the small perforation provided in one head of the can 41, such perforation being indicated at 65, and while it is customary to make the perforation 65 about one-tenth or one-eleventh of an inch in diameter, the invention is not of necessity limited to such diameter, for the perforation may be somewhat larger or it may be somewhat smaller than the diameter given. The tube 64 may be of brass or bronze of commercial size having a bore about one-thirtieth of an inch in diameter, but here again the invention is not restricted to any specific sizes, but the size of the perforation and the size of the tube are chosen with respect to the material to be filled into the cans, the sizes given having been found in practice to fulfil the conditions with respect to evaporated milk and even with such substance tests have shown that these sizes may be varied within limits without material interference with the operation of the invention. The conditions to be met are that the perforation in the can should be of a sufficiently small size to admit of closing the perforation by a drop of solder without liability of the solder entering the can in the form of shot or the milk when filled into the can escaping therefrom spontaneously while the can is in the inverted position and after the tube has been withdrawn therefrom. Furthermore the perforation in the can should not be so small or the tube 64 of so large a diameter as to prolong the filling operation inordinately by too great a throttling of the perforation by the tube.

Each tube 64 enters a cup 66, such cup being closed at one end and open at the other and at the open end is shown as internally screw threaded to receive a screw plug 67 having the end remote from that entering the cup 66 somewhat rounded, as indicated at 68. The plug 67 is provided with a lock nut 69 between which and the corresponding end of the cup 66 there is interposed a packing washer 70. The plug 68 is axially counterbored and internally screw threaded, as shown at 71, to receive a nut 72 having a central passage 73 therethrough, this passage being of a size to freely yet snugly receive the tube 64. The nut 72 confines within the counterbore 71 a block 74 of packing material, such as rubber, and this packing material may be made to snugly embrace the tube 64 between the nut 72 and the inner end of the counterbore 71, thus holding the tube firmly against longitudinal movement with the nut 72 centering the tube and the packing 74 preventing leakage of air about the tube. The nut and packing provide a ready means for the longitudinal adjustment of the tube 64 with relation to the cup 66, the tube 64 being substantially axial to the cup 66.

Projecting from the cup 66 on opposite sides are arms 75 and 76, respectively, both rising in a direction away from the cup, the latter in operative position being approximately upright, although in certain positions of operation it may tilt to a small extent.

Entering the cup 66 near the lower or closed end thereof is a pipe 77 extending through the slot 63 of the plate 61, the slot being of a diameter to embrace the pipe sufficiently close to prevent any material side play thereof. The arm 76 is of a length to also extend into the slot 63 and preferably through the same, and this arm 76 together with the pipe 77 effectually guides the cup 66 in movements to be described.

In the form shown in Fig. 1 and associated figures each pipe 77 is carried toward the axis of rotation of the rotatable parts of the machine and is connected by an elbow 78 to one end of a short length 79 of pipe, the other end of which terminates in a rounded or ball portion 80 which in turn is seated in a cup 81 in one end of a nipple 82, the latter entering the chamber 14 through the cover 11. The pipe 79 and nipple 82 where engaging at the ball and socket connection 80—81 are surrounded by a sleeve 83 of elastic material, such as soft rubber, which will unite the pipe 79 to the nipple 82 in an air tight manner, while at the same time permitting a flexibility of movement between the two elements, the union being in the nature of an elastic joint, although the feature of elasticity is not necessarily of any moment, it only being necessary that flexibility of connection be present, and the connection be practically air tight. The same result may be brought about by the construction shown in Fig. 8 where the elbow 78 is connected to a section 79$^a$ of the pipe entering the chamber 14 through a passage 84 in the cover 11. This passage being counterbored for the reception of a nut 85 confining a packing ring 86 in the counterbored portion of the passage and the pipe 79$^a$ extends through the nut 85 and packing ring 86, being there externally grooved, as indicated at 87, to prevent longitudinal movement of the pipe 79$^a$, while the yielding of the packing 86 will permit movements of the pipe 77 as though the pipe 79$^a$ were connected to the cover 11 by a hinge, while the pipe 79$^a$ is in air tight relation to the cover 11.

In the operation of the machine the pipe 64 has an inoperative position where its upper or open end is below the level of the respective gasket 53, so that a can may be placed in position on a plate 35 when the gasket 53 is below the upper surface of the plate 35 and the open end of the tube 64 is also below such level. When a can has been properly placed in a can basket, the carrier for the tube 64, such carrier consisting of the cup 66 and associated parts, is moved in the direction to cause the tube 64 to enter the inverted can through the passage 65, the tube entering the can to a point near the imperforate end thereof and the extent of movement of the tube into the can determines the level to which the can is filled. In the particular arrangement shown in Fig. 3 this level is indicated by the dotted line 88.

In the inactive position of the tube 64 the cup 66 has been lowered until the pipe 77 is close to the lower end of the slot 63, or in some arrangements the lower limit of travel of the cup 66 is determined by the engagement of the pipe 77 with the lower end wall of the slot 63, the expressions of position being with reference to the installed machine. When the cup 66 has been raised to its upper limit of travel the rounded edge 68 of the plug 67 engages the gasket 55 and a continued upward movement of the cup 66 causes a lifting of the block 46 until the gasket 53 has in turn engaged the then lower or perforated head of the can 41 and lifted the can until stopped by the abutment 40 or ring 33, as the case may be, the range of movement of the cup 66 being sufficient to compress the gaskets 53 and 55 into air tight relation to the respective surfaces with which they are in engagement and for reasons which will hereinafter appear it is preferred that the gasket 55 be more elastic or yielding than the gasket 53, so as to compress to a somewhat greater extent.

Fast to the legs 1 of the frame is a track 89 which for the greater portion of its length is level or in a plane perpendicular to the axis of rotation of the rotatable members of the machine. This track is held to the legs 1 by bolts 90 which may pass through slots 91 in the legs 1 to permit of a limited adjustment of the track up or down. Each arm 77 at the end remote from the respective cup 66 carries a roller 92 adapted to the track 89, which latter, although for the greater portion of its length is at one level, terminates at one end 93 abruptly and in spaced relation to the end 93 is formed with a section 94 rising from a lower level to the main level of the track 89. The end 93 and the rising portion 94 are spaced apart an appropriate distance to provide for operations to be described, and between the two terminal portions of the track is a section 95 at a lower level, at one end underriding the end 93 of the main track and at the other end having hinged thereto a gate 96 urged constantly by a spring 97 into operative relation to the terminal portion 94 of the track 89, and this gate 96 under the action of the spring 97 constitutes an approaching incline merging into the rising portion 94 to form a rising cam section for engaging the rollers 92 to lift the cups 66 and parts carried thereby from a low position determined by the section 95 to a high position determined by the main portion of the track 89.

Fast to a fixed portion of the machine and in overriding relation to the terminal portion 93 of the track 89 is a spring 98, preferably a leaf spring, and so arranged that an approaching roller 92 will engage the spring 98 and put the same under stress by moving it in a direction away from the track 89, wherefore when the roller reaches the terminal portion 93 of the track the reaction of the spring will cause a sudden actuation of the roller in a direction toward the lower section 95 of the track, so that the movement of the cup 66 and parts carried thereby from the high to the low position is sudden and rapid and much more rapid than would be the case were reliance placed wholly upon the action of gravity. Of course, the plates 61 will arrest the downward movement of the cups 66, but then the shock of the sudden stoppage of this downward movement would be borne by the pipes 77, and these pipes might be injured thereby, wherefore it is preferable to provide the section 95 to withstand the shocks. In the particular structure shown in the drawings the track sections 89 and 95 are indicated as made of angle metal, but, of course, it will be understood that they may be made in any desirable form.

In the structure described the plates 35 of the can baskets maintain a constant level throughout their rotative movement, and in order to feed empty cans to the can baskets and remove filled cans, there is provided for the feeding of the cans a conveyer belt 99 which may pass about a guide roller 100 on a standard 101 adjacent the machine, this belt discharging on to spaced fingers 102 terminating close to the outer margins of the plates 35, which latter may be substantially segmental with their side edges as close together as may be convenient in the manufacture of the machine and their peripheries substantially concentric to the axis of rotation of the series. The cans are fed by the belt 99 between side guide rails 103 and are received one by one in respective baskets 34 as these baskets come opposite the discharge end of the rails 103, it being customary to cause the belt 99 to travel at a slightly faster rate than is necessary to deliver the empty cans, so that the latter are always under some pressure as they enter the can baskets. At an appropriate distance in advance of the can feeding devices there is provided a take off finger 104 shown in Fig. 2 and so positioned as to engage approaching filled cans and direct them into a chute 105 adjacent the machine from which the cans may be delivered to any suitable point of disposal. The take off finger 104 and the can feeding devices are located between the end 93 of the track 89 and the gate 96.

When the neck 42 is made round and the block 46 is also round, the latter may rotate in the neck unless provision be made to prevent such rotation. This is readily accomplished by providing a passage 106 in the flange 44 for the pipe 49, this arrangement being best shown in Figs. 4 and 20, whereby the pipe 49 when seated in the passage or notch 106 locks the block 46 against rotative movement in the respective neck 42, but does not interfere with movement of the block longitudinally of the neck.

Let it be assumed that the machine is in operation with a suitable supply of evaporated milk and that the cans are being fed to the machine properly. The cans approach the machine and are deposited one by one in order upon the plates 35 as they come opposite the feeding mechanism, each can having been placed upon the feeding mechanism with the perforated end downward. As soon as each roller 92 reaches the hinged member 96 it is lifted thereby and the corresponding cup 66 and parts carried thereby participate in such movement. The guide 36 having centered the can properly the tube 64 which when the cup 66 is in the lowered position has its upper end at or below the upper surface of the web 51, moves upwardly through the perforation $52^a$ and into the can and as the cup 66 approaches its upward limit of travel the block 46 is lifted, at the same time lifting the can until the upward movement of the can is stopped by engagement with the fixed member 33 or 40 in its path, whereby the can is firmly clamped until again lowered. At all times the cup 66 is freely connected to the chamber 14 by the pipe 77 and sub-atmospheric pressure is maintained within the chamber 14 by a suitable vacuum pump, one example of which is hereinafter described with reference to Fig. 17, and the capacity of the vacuum pump is such that a suitable condition of sub-atmospheric pressure may be maintained in the chamber 14 even though all the tubes 64 were freely open to the atmosphere. While a tube 64 is entering a can 41 and approaching the imperforate end thereof it is withdrawing air from the can, but the junction between the gasket 53 and the can is at this time quite imperfect and sufficient air enters to prevent the production of any particular sub-atmospheric pressure within the can. As soon, however, as the gasket 53 is firmly seated against the can and the plug 67 against the gasket 55 the only means for relieving the sub-atmospheric pressure is through the pipe 49 and the atmospheric pressure upon the milk within the trough 57 causes the milk to rise through the pipe 49, thence into the passage 48 and finally through the passages 52 into the space within the gasket 53 and through the perforation 65 about the tube 64 into the can. By properly proportioning the machine and the speed of movement of the can support, the milk will flow into the can until it reaches the top of the tube 64, when any excess of milk will flow into the tube 64 and from the latter into the cup 66 and ultimately through the pipe 77 into the chamber 14. Finally the roller 92 reaches the terminal portion 93 of the track and under the impulse of the spring 98 the cup 66 moves quickly downward until arrested by the engagement of the roller 92 with the section or rail 95. The tube 64 is, therefore, withdrawn with great rapidity from the can and the seals at the gaskets 53 and 55 are suddenly broken, the seal at the gasket 53 breaking first because of the greater compression of the more elastic gasket 55, wherefore there remains a condition of sub-atmospheric pressure within the can close to the imperforate head thereof which tends to pull in any slight quantity of milk which may gather about the perforation 65, while the action of gravity upon any milk which may be within the passage 48 causes the same to return to the trough 57. The inrush of milk and air to relieve the sub-atmospheric pressure within the can also tends to clean the tube 64, so that it does not leave a quantity of milk about the perforation 65. Experience has shown that the perforation 65 is left sufficiently clean for the application of solder without further cleansing, the solder sticking tenaciously, and the passage 48 discharges but a very few drops of milk onto the top of the plug 67.

When the machine is set for a certain size can and it is desired to change the machine for another size of can, the baskets 34 then in use are removed from the spider 32 and the proper other set of baskets 34 are substituted. This will cause the tubes 64 to be either too short or too long in accordance with whether the new set of baskets are for longer or shorter cans, and hence the tubes 64 are adjusted as to their effective length by loosening the nuts 72, slipping the tubes lengthwise and again tightening the nuts, when the machine is ready for operation with the larger or smaller size of can, for which the machine is adjusted.

With the inverted can the milk flows into the can without liability of foaming, but if the difference between the sub-atmospheric pressure within the can and the atmospheric pressure urging the milk into the can be great, there is a liability of the inflowing stream of milk forcing its way through the body of milk in a manner to spurt above the surface of the milk within the can and producing an effect which may be described as geysering. Since there is no adhesion or capillary attraction between air and the walls of the small tube employed as an exhaust tube within the can, the air flows out through the tube very readily, but the milk, because of the capillary size of the tube 64, flows sluggishly therethrough. Therefore, if the rising level of the milk within the can be locally elevated to any considerable extent adjacent the tube 64, the milk will pass into the tube long before the proper filling level has been reached and the retarding action of the tube upon the outflow of milk through it will result in prolonging the filling operation very materially. When the pressure is too great the geyser sometimes forms closely adjacent to the tube 64, and again will be produced at some little distance therefrom, so that in the first instance the filling operation is retarded, while in the second instance it will proceed as though no geyser were present. But, in order to insure the filling of all the cans alike, the machine must be so operated as to correspond to the slowest time of filling, wherefore if geysering be present the more quickly filled cans will overflow into the exhaust tubes for a material time before those cans which are more sluggish in filling have received the full amount of milk.

Experience has demonstrated that with short cans, which approximate two and one-half inches in height, a degree of partial vacuum corresponding to six or seven inches of the mercury vacuum gage, or as it is commonly known, six or seven inches of vacuum, causes a sufficiently rapid inflow of milk without producing the geysering action and the rising milk has a surface very nearly level when it reaches the top of the exhaust tube. It is not impracticable to use a higher degree of partial vacuum, but it is not advisable to use any higher degree of vacuum than will cause the milk to flow into the can in a sufficiently gentle manner to prevent the milk from geysering or spurting up over the exhaust tube because of its forcible entrance into the can, thus choking the exhaust tube temporarily until the suction clears it from the milk entering it. When the degree of vacuum is comparatively low the cans fill very closely to uniformity as to time of filling, so that the operator may set the speed of the machine very nearly to the absolute time of filling, thus limiting to a minimum the amount of milk that ultimately passes through the exhaust tubes into the chamber 14. With tall cans which approximate, say, four and one-half inches in height, experience has shown that the degree of partial vacuum may be increased to eleven or twelve inches without the liability of the inflowing milk geysering or spurting up over the exhaust tube. However, the figures given are not to be taken as absolute and the invention is not limited to the use of any particular degree of sub-atmospheric pressure.

With the smaller cans, those about two and one-half inches high, the filling operation under six or seven inches of vacuum will approximate one-half minute and with the tall cans which approximate four and one-half inches in height, the time consumed in filling is about one minute under eleven or twelve inches of vacuum, it being understood that these figures have reference to evaporated milk as the filling material, for with other materials the times of filling will vary in accordance with the character of the material.

The speed of rotation of the rotatable member of the machine will depend upon the number of cans the machine is designed to carry at one time. Without increasing the diameter of the machine beyond reasonable limits it may be made to carry from seventy to one hundred cans and in accordance with the size of can may be rotated approximately one or two times per minute, the speed of rotation for the small cans being greater than that for the large cans, since the small cans are filled in a shorter space of time than the large cans, even though the degree of vacuum employed for the large cans be greater than that for the small cans.

While the sudden withdrawal of the tube 64 from the filled can and the breaking of the seal at the gaskets 53 and 55 causes a cleansing of the can about the perforation 65 due to the equalization of the pressure within the can and exterior thereto, there is still some little milk left in the passage 48 which will tend to gravitate therefrom, and this milk may flow over the plug 66 and ultimately drop into the trough 57, which latter at all times underrides the cup 66 and adjacent parts, for the arms 75 and 76 are both disposed at an angle to the cup in rising relation thereto, wherefore any milk finding its way onto the arms 75 and 76 will run down these parts onto and then from the cup and ultimately drop into the trough 57.

When the machine is in proper working order there is a slight amount of milk drawn into the end of the tube 64 near the imperforate end of the can at the termination of the filling operation, and this milk finds its way into the cup 66 and from thence through the pipe 77 into the chamber 14, finally gravitating into the neck 7. From time to time atmospheric pressure is restored in the tank 14 and then the valve 18 is opened and milk collected in the neck 7 and chamber 14 will flow into the tank 19. The valve 18 may then be closed and the air exhaust pump started, after which the filling operation may proceed as before and by operating the air force pump 21 super-atmospheric pressure is produced within the tank 19 and milk therein is forced up through the pipe 22 which leads at its discharge end into directing relation to the annular tank 57, so that milk from time to time deposited in the tank 19 may be forced back into the tank 57 to be directed into the cans during the operation of the machine.

It may occasionally occur that a can is placed in the feeding apparatus in the upright position, that is, with the perforated end or head uppermost. Under these circumstances the tube 64 is unable to enter the can but engages the imperforate head thereof and the can is raised until its further progress is arrested by the stop plate 40. This movement will occur while the roller 92 is on the gate 96, the spring 97 being resistant enough to hold the gate 96 is the elevated position during the normal operation of the machine, but when a tube 64 abuts against the head of a can where there is no perforation, the extra resistance presented will cause a compression of the spring 97 and the gate will be forced to the lower or open position allowing the roller 92 to pass off the end of the gate without reaching the rigid rising portion 94 of the track 89, and as soon as the roller has passed off the gate the latter is at once returned to the closed position by the spring 97 in order to direct the next succeeding roller, provided the can is properly placed, on to the high portion of the track 89. As soon as the roller 92 passes off the track 96 there is nothing to sustain the roller and parts up held thereby and consequently the cup 66 will gravitate until the pipe 77 engages the lower wall of the slot 63 where the parts will be held against further drop, but the rotatable parts of the machine will continue to progress until ultimately the roller reaches the entering end of the lower run 95 of the track and by the latter will be directed again on to the gate 96. In the meantime the finger 104 has removed the empty can and another can which may be assumed to be properly positioned is ready for filling and the filling proceeds as before explained. There is, therefore, no danger of injury to the tubes 64 which though of minute diameter are still amply strong to overcome the resistance of the spring 27 without injury to the tubes.

In Figs. 17 and 18 there is disclosed a somewhat modified form of the structure wherein the rim 33 of the spider 32 is sufficiently extensive to operate as a stop member for the cans. The pipes 77 are replaced by smaller pipes 77ª which at the ends enter the chamber 14 and cup 66, respectively, and by extending these pipes through rubber gaskets 107, as indicated in Fig. 15, a flexibility of union is provided which will permit the pipes 77ª to move up and down without the cups. The gasket 107 is held in place by a gland 108 screwed on to the nipple 109 which in Fig. 15 is shown as entering the cup 66 and the same structure may be employed with relation to the chamber 14. In place of the slotted strips 61 the reservoir tank 57 carries an upstanding guide ring 110 having upright slots 111 therein for the passage of the pipes 77ª and for the passage of arms 112, each of which at one end is connected to an arm 76ª formed on the cup 66 and similar to the arm 76 of the structure shown in Fig. 1 and associated figures. The chamber 14 in the structure shown in Fig. 17 is provided with a cover member 11ª which may be formed in one piece with a shaft 5ª similar to the shaft 5, except that the shaft 5ª may be solid. Around the margin of the cover 11ª there is formed an annular groove 113 and applied to the cover 11ª is a ring 114 having a groove matching the groove 113, while those ends of the arms 112 adjacent the axis of rotation are each formed with a disk shaped terminal portion 115 adapted to the groove 113 and the matching groove in the ring 114. In machines containing a large number of filling elements, which number may in practice range from seventy to one hundred for each machine, the disk ends 115 may be brought into side contact, as indicated in Fig. 16, so that each arm is guided and held in position by the arms on both sides, while the disk like terminal portions 115 act as pivots for the arms, permitting the up and down movement of the cups 66 and associated parts.

The neck 7 in the structure shown in Fig. 17 is connected to a pipe 16, as in Fig. 1, and this pipe leads to one end of the air cylinder 116 of an exhaust pump 117, while from this cylinder 116 there leads a pipe 118 ultimately discharging into the tank 57, wherefore milk collected in the neck 7 and compartment 14 is pumped back into the tank 57 as rapidly as it flows into the compartment 14 and neck 7.

The track 89 in the structure of Figs. 17 and 18 may be the same as described with reference to Fig. 1 and associated figures, while in place of the arm 75 the cup 66 is provided with an arm 75ª having an angle extension 119 with a downwardly directed portion in which there is formed an elongated slot 120 traversed by a pintle 121 which may be locked in place by nuts 122 thereon, while an adjusting screw 123 facilitates the adjustment of the pintle along the slot 120. The pintle 121 carries a roller 92ª adapted to the track 89. In order to provide for the upholding of the cup 66 and associated parts when, because of a non-inverted can, it passes through the gate 96, there is provided an annular ring 124 secured by brackets 125 to the ring 110 and the angle extension 119 of the arm 77ª has a toe portion 126 adapted to ride on the ring 124 under the circumstances assumed. The slots 111 are simple guiding slots and it is not designed that the lower ends of these slots should sustain the cups 66, since the tubes 77ª are usually too delicate to withstand undue wear or shock.

It is unnecessary to describe in detail the operation of the structure shown in Figs. 17 and 18 so far as the filling of cans is concerned, since that operation is the same as that already described with reference to the structure of Fig. 1, but the adjustments shown in Figs. 17 and 18 and the adjustment of the track shown in Fig. 1 provides for any shortening of the gaskets 53 and 55 by repeated compression, such nozzles sometimes obtaining a permanent set, so that unless the parts be adjusted to meet the changed relations leakage would occur.

In Fig. 15 the tube 64 is carried by a plug 67ª through the intermediary of a screw bushing 127 which may be locked in place by a lock nut 128 applied to the bushing, so that the effective length of the tube 64 may be varied, as desired, and in the particular structure shown tubes 64 of different lengths may be provided for the different sizes of cans, so that on the changing of the can baskets corresponding tubes may be employed to bring the open ends of the tubes into proper relation to the closed ends of the cans.

The can baskets have been described as separate structures separately applied and removable, but it is evident that these parts may be all cast in one piece or in groups, and that other parts which are described as separate structures may be differently constructed.

Many of the claims in this case read upon the disclosure of my aforesaid application Serial No. 634051, for it is intended that the present application shall cover the invention generically with respect to causing the flow of milk into cans through small filling perforations therein when the cans are in the inverted position, by producing sub-atmospheric conditions within the cans, and it is deemed unnecessary to incorporate in this application a disclosure of the said earlier application in order to define the intended scope of the claims herewith presented, some of said claims having been originally presented in the said earlier application.

The process of canning liquids herein disclosed but not claimed is described and claimed in my copending application Serial No. 669,886, filed on January 6, 1912, for process of canning liquids.

What is claimed is:—

1. In an apparatus for filling cans each of which is provided with a single small filling perforation in one head of a diameter to prevent spontaneous outflow of liquid therethrough when the can is inverted, means shaped to sustain the can in the inverted position with the perforated head downward, a sealing device for effecting an air tight seal with the perforated head of the can around the perforation, means for directing the material into the can through the perforation in the then lower end of the can, and air suction means terminating in a tube of a cross sectional area less than the size of the filling perforation of the can and of a length to enter the can into close proximity to the imperforate head of the can.

2. In an apparatus for filling cans, each of which is provided in one head with a single small filling perforation of a diameter to prevent spontaneous outflow of liquid therethrough when the can is inverted, means shaped to sustain the can in the inverted position and including a sealing device for effecting an air tight seal with the perforated head of the can around the perforation, means for directing material through the sealing device into the can when in the inverted position through the small perforation in the then lower end of the can, and air suction means terminating in a tube of a cross sectional area less than that of the filling perforation and of a length to enter the can into proximity to the imperforate end thereof, said can support having means for centering the can with respect to the air tube.

3. In an apparatus for filling cans each of which is provided with a single small filling perforation in one head of a diameter to prevent spontaneous outflow of liquid therethrough when the can is inverted, means for sustaining the can in the inverted position and including a relatively rigid part to engage the peripheral portion of the perforated head of the can, and a flexible part to form a sealing engagement with the perforated head of the can about the perforation, means for directing material into the can through the flexible sealing part when the can is on the support in the inverted position, and an air suction means terminating in a tube of a cross sectional area less than that of the filling perforation and of a length to enter the can through such perforation into close proximity to the imperforate and then upper end of the can.

4. In an apparatus for filling cans each of which has one head provided with a single small filling perforation of a diameter to prevent spontaneous outflow of liquid therethrough when the can is inverted, means for supporting the can in the inverted position, means for conveying and directing liquid to the filling perforation of the inverted can, and an air suction means terminating in a tube of less cross sectional area than the filling perforation of the can and introducible into and removable from said inverted can through the filling perforation in the then lower end of the can, the air suction means being constructed for constant action when in operative relation to the can.

5. In a machine for filling cans each of which is provided with a single small filling perforation in one head of a diameter to prevent spontaneous outflow of liquid from the can when inverted, means for holding cans in the inverted position with the perforated end downward, a reservoir for liquid to be filled into the cans located at a lower level than the holding means for the cans, conduits leading from the reservoir to the perforated ends of the cans when in the inverted position, and air suction means terminating in tubes individual to the can holding means and each of a cross sectional area less than that of the perforation in a can and of a length to reach into close proximity to the imperforate end of the inverted can, the air suction means being constantly active while in operative relation to the cans.

6. In a machine for filling cans, each of which is provided with a single small filling perforation in one head of a diameter to prevent spontaneous outflow of liquid from the can when inverted, means for holding the cans in the inverted position with the perforated end downward, conduits leading from a reservoir to the filling perforations of the cans when in the inverted position, and air-suction means terminating in tubes individual to respective holding means and each of a cross sectional area less than that of the perforation in a can and of a length to reach into close proximity to the imperforate end of the inverted can, the terminal tubes of the air suction means being movable into the cans and wholly out of the cans, and said air suction means being arranged for continuous action during the operation of the machine.

7. In a machine for filling cans, each with a small filling perforation at one end, a reservoir for the material to be filled into the cans, a series of means for holding the cans in an inverted position with the filling perforation downward, said holding means each including elastic can engaging means for sealing the can around the perforation, a conduit for each can holding means leading from the reservoir into position to discharge to the small perforation of an inverted can, and air exhaust means including conduits leading and individual to each can holding means and there provided with a terminal portion of a diameter and length to extend through the perforation in the can to substantially the level to which the can is to be filled.

8. In a machine for filling cans each provided with a single small filling perforation at one end, a relatively fixed means for sustaining the can in the inverted position, a movable member working through the bottom of the can sustaining means and carrying a sealing device at its upper end, and a movable conduit carrying an air exhaust tube in position to pass through the movable member and sealing device, the movement of said conduit effecting a movement of said member and sealing device into sealing engagement with a can placed upon the can sustaining means.

9. In a machine for filling cans each provided with a single small filling perforation at one end, a relatively fixed means for sustaining the can in the inverted position, a movable member working through the bottom of the can sustaining means and carrying a sealing device at its upper end, and a movable conduit carrying an air exhaust tube in position to pass through the movable member and sealing device, the movement of said conduit effecting a movement of said member and sealing device into sealing engagement with a can placed upon the can sustaining means, the movable member being provided with a second sealing device in coactive relation to the movable conduit carrying the air tube.

10. In a machine for filling cans each with a small filling perforation at one end, a rotatable reservoir for the material to be filled into the cans, a series of means for receiving the cans in an inverted position with the filling perforation downward, elastic can engaging means for sealing the can about the perforation, a conduit for each can receiving means leading from the reservoir into position to discharge to the small perforation of the inverted can, a centralized exhaust chamber participating in the rotary movements of the reservoir, and conduits leading from the exhaust chamber to each can receiving means, each exhaust conduit being there provided with a terminal portion of a diameter and length to extend through the perforation in the inverted can and enter the can to substantially the level to which the can is to be filled.

11. In a machine for filling cans each with a single small filling perforation or orifice at one end of a diameter to prevent the spontaneous outflow of material from the can when the latter is inverted, means for temporarily supporting the can in an inverted position while being filled, means for conducting filling material to the then lower end of each can for entrance into the can in an upward direction, and means active throughout the filling operation for exhausting air from the can adjacent the imperforate and then upper end through the filling perforation.

12. In a machine for filling cans each with a single small filling perforation or orifice at one end of a diameter to prevent the spontaneous outflow of material from the can when the latter is inverted, means for temporarily supporting the can in an inverted position while being filled, a conduit for filling material leading to the can supporting means for directing the filling material upwardly into the can through the filling perforation, and means active throughout the filling operation and including an air exhaust tube adapted to enter the can through the filling perforation for withdrawing air from the can adjacent the imperforate and then upper end of the can to cause the inflow of material into the can simultaneously with the withdrawal of air therefrom.

13. In an apparatus for filling cans, each of which is provided with a single small filling perforation of a diameter to prevent the spontaneous outflow of milk filled into the can when the latter is in the inverted position, means for supporting a can in the inverted position, a material directing conduit having a limited movement into and out of active relation to the lower end of the inverted can when in position on the support, and an air suction tube of a diameter to enter the can through the small perforation in spaced relation to the walls of the perforation and of a length to extend into close relation to the end of the can remote from the filling perforation, the air suction tube having a range of movement sufficient to move it into the can to the filling level and to withdraw it wholly from the can.

14. In an apparatus for filling cans each of which is provided with a single small filling perforation in one end of a diameter to prevent the spontaneous outflow of material from the can when inverted, means for receiving a can in the inverted position with the end containing the filling perforation downward, a material directing means having a limited movement with relation to the can receiving means into and out of engagement with the perforated end of the inverted can, an air suction means including a tube of a diameter and length to enter the can through the small perforation therein in spaced relation to the walls thereof and to extend into close relation to the end of the can remote from the filling perforation, the air suction means having a range of movement to project the tube into the can and to withdraw it wholly therefrom and related to the material directing means to move the latter into engagement with the can.

15. In an apparatus for filling cans each of which is provided with a single small filling perforation in one end of a diameter to prevent the spontaneous outflow of material from the can when inverted, means for receiving a can in the inverted position with the end containing the filling perforation downward, a material directing means having a limited movement with relation to the can receiving means into and out of engagement with the perforated end of the inverted can, an air suction means including a tube of a diameter and length to enter the can through the small perforation therein in spaced relation to the walls thereof and to extend into close relation to the end of the can remote from the filling perforation, the air suction means having a range of movement to project the tube into the can and to withdraw it wholly therefrom, the material directing means being located in the path of the suction means for movement by the latter when the suction tube is being moved into the can.

16. In an apparatus for filling cans each with a small filling perforation in one end of a diameter to prevent the spontaneous outflow of material from the can when inverted, a carrier for the can in which the can may be moved longitudinally for a limited distance, a material directing means supported by the carrier and having a limited movement therein toward and from the can, and an air exhaust tube and support therefor movable into and out of engagement with the material directing means, the diameter and length of the tube and the range of movement of its support being such that the tube may be moved into the can through the small perforation in spaced relation to the walls of the perforation to a point in close relation to the end of the can remote from the filling perforation, and to be withdrawn wholly from the can and the tube support being related to the material directing means to engage the latter to move the same into engagement with the can as said tube approaches the imperforate end of the can.

17. In an apparatus for filling cans each provided with a single small filling perforation at one end of a diameter to prevent the spontaneous outflow of material from the can when the latter is in the inverted position, basket for receiving the can in the inverted position and having a neck below the can receiving part, a block adapted to the neck for limited movement lengthwise thereof and provided with an interior passage, said block having sealing means at both ends and also carrying a fluid conducting tube leading to the interior of the block, a reservoir positioned to receive the end of the tube remote from the block, a chambered member, a tube adapted to be secured to the chambered member and of a length and diameter to extend through the filling perforation in the inverted can to a point adjacent the imperforate end of the can, said last named tube being provided with connections for exhausting air from the can therethrough, and means for imparting to the chambered member and tube carried thereby a movement sufficient to insert the tube into the can and to withdraw it wholly from the can.

18. In an apparatus for filling cans each provided with a single small filling perforation at one end of a diameter to prevent the spontaneous outflow of material from the can when the latter is in the inverted position, a basket for receiving the can in the inverted position and having a neck below the can receiving part, a block adapted to the neck for limited movement lengthwise thereof and provided with an interior passage, said block having sealing means at both ends and also carrying a fluid conducting tube leading to the interior of the block, a reservoir positioned to receive the end of the tube remote from the block, a chambered member, a tube adapted to be secured to the chambered member and of a length and diameter to extend through the filling perforation in the can to a point adjacent the imperforate end of the can, said last named tube being provided with connections for exhausting air from the can therethrough, and means for imparting to the chambered member and tube carried thereby a movement sufficient to insert the tube into the can and to withdraw it wholly from the can, the block participating in the movement of the chambered member during the final portion of the travel of the latter toward the can, and a sealing means at the end of the block remote from the can being more compressible than that adjacent the can.

19. In an apparatus for filling cans each of which is provided with a single small filling perforation at one end of a diameter to prevent the escape of liquid from the can when the latter is in the inverted position, a basket for receiving the can in the inverted position during the filling, fluid directing means carried by the basket and having a limited movement therein into and out of engaging relation with the perforated end of the inverted can, a reservoir positioned to constantly supply the fluid directing means with liquid, an exhaust chamber, exhaust conduits leading therefrom and capable of rocking movement, a chambered member connected to the end of each exhaust conduit remote from the chamber and movable into and out of engagement with the fluid directing means carried by the can basket, an exhaust tube carried by each chambered member and movable into the inverted can through the small perforation in the can to a point adjacent the imperforate end of said can and also movable to a position where the exhaust tube is wholly withdrawn from the can, said exhaust tube communicating with the interior of the chambered member and of a diameter to permit the flow of fluid into the can through the filling perforation when the tube is traversing said perforation, and means for imparting to the chambered member and parts carried thereby the stated movements.

20. In an apparatus for filling cans each with a single small filling perforation at one end of a diameter to prevent spontaneous outflow of liquid therefrom when the can is inverted, a holder for receiving a can in the inverted position, means for directing liquid to the small perforation in the inverted can, and means for exhausting air from the end of the can remote from the perforation comprising rockable means including an air conduit, and an exhaust tube of a diameter and length to enter the can through the small perforation to a point near the imperforate end of the can and in spaced relation to the walls of the perforation, the rockable means having a range of movement to cause the tube to enter the can to the desired extent and to move wholly out of the can while on the support.

21. In an apparatus for filling cans each with a filling perforation in one end of a diameter to prevent spontaneous outflow of liquid from the can when the latter is inverted, a holder for receiving the can in the inverted position, means for directing liquid to the small perforation in the inverted can, and means for exhausting air from the end of the can remote from the perforation comprising rockable means including an exhaust conduit and a chambered member, said tube being of a length to extend into a can on the support to a point adjacent the imperforate end of the can, and a rockable member having a range of movement to cause the tube to enter the can to the desired extent and to move wholly out of the can while the latter is in the holder.

22. In an apparatus for filling cans each with a filling perforation in one end of a diameter to prevent spontaneous outflow of liquid therefrom when the can is inverted, a holder for receiving the inverted can, liquid directing means carried by the holder and movable into and out of engagement with the perforated end of the can, and air exhausting means movable into engagement with the liquid directing means and moving the latter into engagement with the can, said air exhausting means being provided with an air exhaust tube of a length and diameter to move into and out of the can through the filling perforation in spaced relation to the walls of the perforation and to extend into close relation to the end of the can remote from the perforated end.

23. In an apparatus for filling cans each provided with a filling perforation at one end of a diameter to prevent spontaneous outflow of liquid from the can when the latter is inverted, a holder for a can when in the inverted position, a slidable block mounted in the holder, said block carrying gaskets at opposite ends and having a central passage with a perforated guiding web at the end presented toward the can, a chambered member having a plug at one end movable into engagement with one of the gaskets to force the other gasket into sealing relation to the perforated end of the inverted can, means for moving the chambered member into engagement with the gasket on the block, a tube carried by the plug in communication with the interior of the chambered member and of a length and diameter to extend through the guiding web in the block and to move into and out of a can through the small filling perforation in spaced relation to the walls thereof and to a point close to the imperforate end of the can, and means for withdrawing air from the chambered member and through the tube carried thereby.

24. In an apparatus for filling cans each provided with a filling perforation in one end of a diameter to prevent spontaneous outflow of liquid therefrom when the can is inverted, a circular series of holders for cans with the perforated ends downward, a slidable block mounted in each holder and provided with gaskets at opposite ends, said block having a central passage with a perforated guiding web at one end, a centralized exhaust chamber for all the cans, a series of exhaust conduits, leading from the exhaust chamber toward the can holders and each capable of rocking movement, guiding means for the conduits, a tube carried by each conduit and movable through the guiding web of a respective block, said tube being of a length and diameter to enter a can through the small perforation in spaced relation to the walls thereof and to a point adjacent the imperforate end of the can, and means for moving the tubes into and out of the cans and when moved into the cans also moving into sealing relation to the block and moving the latter into sealing relation to a respective can.

25. In an apparatus for filling cans each provided with a single small filling perforation in one end, a can basket adapted to receive a can with the filling perforation downward, a slidable block carried by the can basket and provided with sealing means at each end, and a tube for directing fluid to be filled into the cans to the interior of the block, the latter having a passage therethrough with a guiding web at one end, sealing gaskets at opposite ends of the block, a slotted plate carried by the basket, a rockable exhaust tube traversing the slot in the plate, a cup carried by the tube, a closing plug for the cup movable into and out of engagement with the gasket remote from the one adjacent the can receiving portion of the basket, and an exhaust tube carried by the plug and of a length and diameter to extend through the guiding web and into a can through the small perforation in spaced relation to the walls of the latter.

26. In an apparatus for filling cans through a small filling perforation in each when the cans are in the inverted position, a can basket comprising two spaced members in fixed relation one to the other separated by a distance greater than the length of a can, a bracket carrying the can engaging members, and a guard also carried by the bracket in the position to center a can with relation to the can engaging members.

27. In an apparatus for filling cans through a small filling perforation in each when the cans are in the inverted position, a can basket comprising two spaced plates in fixed relation one to the other and separated by a distance greater than the length of a can, one of the plates having a passage therethrough, a bracket carrying the plates, and a guard also carried by the bracket in position to center a can with relation to the passage through one of the plates.

28. In an apparatus for filling cans each through a small filling perforation in one end when the can is in the inverted position, interchangeable can baskets all of the same length and each provided with a plate or support for receiving the perforated end of a can, a guard for positioning the can on the plate or support, and a stop plate in spaced relation to the first named plate and separated therefrom a distance greater than the length of the can to be supported, the interchangeable can baskets differing one from the other in the distance of the stop plate from the supporting plate and the relation of the guard to a predetermined point on the supporting plate in accordance with the differences in the sizes of the cans.

29. In an apparatus for filling cans each through a small filling perforation in one end thereof, interchangeable can baskets for cans of different sizes, exhaust tubes adapted to enter the cans through the small filling perforations to points determining the filling level of the cans, carrying means for the exhaust tubes having a range of movement toward and from the can receiving portions of the can baskets, and means for varying the extent of movement of the exhaust tubes with relation to the can receiving portions of the can baskets in accordance with the length of the cans to be filled.

30. In an apparatus for filling cans through a small filling perforation in one end of each while the cans are in the inverted position, a can basket having a predetermined position of height with reference to the remainder of the machine, an exhaust tube for each can, means for moving the exhaust tube into and out of the inverted can, and means regulating at will the effective length of the tube and its range of movement with relation to the can basket to provide for cans of different lengths.

31. In an apparatus for filling cans each through a small filling perforation in one end while the cans are inverted, a can basket having a member at a predetermined position of height with reference to the remainder of the machine, an air exhaust tube for each can movable into the can to a point adjacent the imperforate end thereof and also wholly out of the can, and a supporting means for the tube comprising a chambered member with which the tube communicates, an adjustable plug for one end of the chambered member, and means for holding the tube in the plug in adjustable relation thereto.

32. In an apparatus for filling cans each through a small perforation in one end while the can is inverted, a can basket, a block having a limited range of movement toward and from the can receiving portion of the basket, said block having means for conducting liquid thereto and also being provided with packing means at both ends, an air exhaust tube movable through the block into and out of the inverted can, a chambered member for carrying the exhaust tube, means for moving the chambered member toward and from the block, a plug for one end of the chambered member adjustable therein in the direction of movement of the chambered member, said plug being in position to engage the packing means remote from the end of the block toward the can receiving part of the can basket, and a holding means for the exhaust tube adapted to the plug.

33. In an apparatus for filling cans each through a small perforation in one end while the can is inverted, a can basket, a block having a limited range of movement toward and from the can receiving portion of the basket, said block having means for conducting liquid thereto and also being provided with packing means at both ends, an air exhaust tube movable through the block into and out of the inverted can, a chambered member for carrying the exhaust tube, means for moving the chambered member toward and from the block, a plug for one end of the chambered member adjustable therein in the direction of movement of the chambered member, said plug being in position to engage the packing means remote from the end of the block toward the can receiving part of the can basket, and a holding means for the exhaust tube adapted to the plug, said tube holding means comprising a packing ring and a compression member therefor, the plug being chambered out to receive the ring and compression member in surrounding relation to the exhaust tube.

34. In an apparatus for filling cans each with a filling perforation in one end of a diameter to prevent spontaneous outflow of liquid therethrough when the can is inverted, an air exhaust tube movable into and out of the can through the small perforation and when in the can extending into close relation to the imperforate end thereof, means for moving the exhaust tube into the can, and mechanical means for causing a sudden, rapid removal of the exhaust tube from the can.

35. In an apparatus for filling cans each with a filling perforation of a diameter to prevent spontaneous outflow of liquid therefrom when the can is inverted, an air exhaust tube of a diameter to enter an inverted can through the small perforation therein in spaced relation to the walls of the perforation and of a length to reach to a point adjacent the imperforate end of the can, a carrier for the exhaust tube, a track in the path of the carrier for causing a movement of the exhaust tube into the can and to maintain it therein during the filling operation, and mechanical means for causing a rapid, forceful removal of the tube from the can after the filling operation has been completed.

36. In an apparatus for filling cans while in the inverted position, a rotatable series of carriers for the cans, a rotatable series of pivotally supported members, a track in the path of the pivotally supported members at points remote from their pivot supports, said track being shaped to cause the pivoted members to move toward the can carriers and to maintain them in such position during the greater part of the rotative movement, the track terminating abruptly at one end, an air exhaust tube carried by each pivoted member and of a size and length to move into and out of the inverted can and when in the latter to extend to a point adjacent the upper end thereof, means for directing material to be filled into the cans to the lower ends thereof by the action of the exhaust tubes on the air within the can, and means at the said end of the track for causing a sudden forceful movement of each exhaust tube from the respective can.

37. In an apparatus for filling cans while in the inverted position, a rotatable series of carriers for the cans, a rotatable series of pivotally supported members, a track in the path of the pivotally supported members at points remote from their pivot supports, said track being shaped to cause the pivoted members to move toward the can carriers and to maintain them in such position during the greater part of the rotative movement, the track terminating abruptly at one end, an air exhaust tube carried by each pivoted member and of a size and length to move into and out of the inverted can and when in the latter to extend to a point adjacent the upper end thereof, means for directing material to be filled into the cans to the lower ends thereof by the action of the exhaust tubes on the air within the can, and means at the said end of the track for causing a sudden forceful movement of each exhaust tube from the respective can, the said last named means comprising a spring in the path of the pivoted member and put under tension thereby to impel said pivoted member on leaving the track in a direction away from the can.

38. In an apparatus for filling cans each with a small filling perforation in one end, a rotatable series of means for receiving the cans in the inverted position, a centralized exhaust chamber, a circular series of pipes in pivoted relation to the exhaust chamber and communicating therewith, a cup like member at the end of each pipe remote from the exhaust chamber, an air exhaust tube carried by each cup-like member and of a length and diameter to enter a can through the small filling perforation therein to a point adjacent the imperforate end of the can, a material conduit carried by each can receiving means and movable therein, each material conduit being provided with sealing means for engagement with a can and with the cup-like member, respectively, a material reservoir into which the material directing conduits extend, said reservoir also participating in a rotative movement of the can supports, and means for moving the cup-like members and parts connected thereto to force the conduits against the cans and the air exhaust tubes into the cans for causing the filling of the cans and to withdraw the conduits and filling tubes from operative relation to the cans at the termination of the filling operation.

39. In an apparatus for filling cans while in the inverted position, air exhaust tubes movable into and out of the cans, and supporting means for the exhaust tubes individual thereto and each comprising an air pipe carrying an exhaust tube at one end and at the other having a pivotal support.

40. In an apparatus for filling cans while in the inverted position, air exhaust tubes movable into and out of the cans, and supporting means for the exhaust tubes individual thereto and each comprising an air pipe carrying an exhaust tube at one end and at the other having a pivotal support, said pivotal support comprising an elastic member also acting as a packing.

41. In an apparatus for filling cans while in the inverted position, air exhaust tubes movable into and out of the cans, and supporting means for the air tubes individual thereto and each comprising an air pipe having at the end remote from the air tube a pivotal support, said pivotal support comprising a relatively fixed pipe member, and an elastic sleeve surrounding the relatively fixed member and the corresponding end of the supporting pipe for the air tube.

42. In an apparatus for filling cans while in the inverted position, air exhaust tubes movable into and out of the cans, and supporting means for the air tubes individual thereto and each comprising an air pipe having at the end remote from the air tube a pivotal support, said pivotal support comprising a relatively fixed pipe member and an elastic sleeve surrounding the relatively fixed member and the corresponding end of the supporting pipe for the air tube, the supporting pipe and the relatively fixed pipe where connected by the elastic sleeve being in ball and socket form.

43. In an apparatus for filling cans while the latter are in the inverted position, can holders, material directing conduits carried by the can holders, air exhaust tubes movable through the can holders into and out of the cans through the lower ends of the inverted cans, carriers for the tubes each pivotally supported at one end and at the other end having means for the actuation of the carrier, and with air conducting means in position to receive the exhaust tubes, the carriers having a downward dip where joining the air conducting means, and a reservoir positioned beneath the air conducting means to receive the material conduits and to catch the drip from the carriers for the exhaust tubes.

44. In an apparatus for filling cans each through a single small filling perforation while the cans are in the inverted position, a circular series of can holders, a centralized exhaust chamber, exhaust tubes movable into and out of the inverted cans through the small filling perforations and adapted to exhaust from the ends of the cans remote from the filling perforations, a connection between each exhaust tube and the exhaust chamber, means for conducting material into the cans by pressure due to the exhausting of the air from the cans, a receptacle for material collected in the exhaust chamber and connected to said exhaust chamber, and means for causing the flow of material received in the collecting receptacle into position to be again supplied to the material conduits.

45. In an apparatus for filling cans each through a single small filling perforation while the cans are in the inverted position, a circular series of can holders, a centralized exhaust chamber, exhaust tubes movable into and out of the inverted cans through the small filling perforations and adapted to exhaust from the ends of the cans remote from the filling perforations, a connection between each exhaust tube and the exhaust chamber, means for conducting material into the cans by pressure due to the exhausting of the air from the cans, a receptacle for material collected in the exhaust chamber and connected to said exhaust chamber, and means for causing the flow of material received in the collecting receptacle into position to be again supplied to the material conduits, said material receiving and returning means comprising a closed tank, a valved pipe leading from the exhaust chamber to the tank, and an air pump for producing superatmospheric pressure within the closed tank.

46. In a machine for filling cans with liquid through a single small perforation in one end of each can while the latter is in the inverted position, a circular series of can holders, an exhaust tube for each can holder having means for moving it into and out of an inverted can through the small perforation therein, said means including a pivoted member, and a track for engaging the latter, said track being provided with a rising portion at the beginning of the filling zone through which the can travels, a circular support for constant level for the pivoted members corresponding in position to that part of the travel of the exhaust tubes when withdrawn from the cans, and a yieldable gate at the rising portion of the track unresponsive to the weight of the pivoted members and parts carried thereby and yieldable to a resistance caused by the engagement of an exhaust tube with the imperforate head of a can when on the can holder in the uninverted position.

47. In a machine for filling cans with liquid through a small perforation in one end while the cans are in the inverted position, a rotatable circular series of can holders, an exhaust tube for each can holder adapted to be moved into and out of an inverted can through the small perforation therein, a pivoted member carrying the exhaust tube, and a track engaging the pivot member, said track being provided with a rising portion at the beginning of the filling zone through which the cans travel, guiding means for the pivoted members for limiting the extent of movement thereof toward the inactive position when the exhaust tubes are withdrawn from the cans, and a yieldable gate at the rising portion of the track unresponsive to the weight of the pivoted members and parts carried thereby, said gate comprising a hinged section of track with the hinged end toward the approaching pivoted members, and a spring acting on the gate on the side thereof remote from that engaged by the pivoted member.

48. In a machine for filling cans through a small filling perforation in each while the cans are inverted, a circular series of can holders for receiving the cans in the inverted position, air exhaust tubes movable into and out of the cans through the small perforations, material directing conduits movable into air tight relation to the perforated ends of the cans, about the perforations, pivoted members carrying the air tubes and acting on the material conduits to force them into air tight relation to the cans, and a track for actuating the pivoted members, said track being provided with a rising portion for moving the pivoted members into position to engage the material conduits and insert the exhaust tubes into the cans, and having an abrupt terminal portion with elastic means for impelling the pivoted members forcibly in a direction to withdraw the exhaust tubes quickly from the cans.

49. In a machine for filling cans through a small filling perforation in each while the cans are inverted, a circular series of can holders for receiving the cans in the inverted position, air exhaust tubes movable into and out of the cans through the small perforations, material directing conduits movable into air tight relation to the perforated ends of the cans, about the perforations, pivoted members carrying the air tubes and acting on the material conduits to force them into air tight relation to the cans, and a track for actuating the pivoted members, said track being provided with a rising portion for moving the pivoted members into position to engage the material conduits and insert the exhaust tubes into the cans, and having an abrupt terminal portion with elastic means for impelling the pivoted members forcibly in a direction to withdraw the exhaust tubes quickly from the cans, the rising portion of the track being provided with a yieldable gate and each can support being provided with a slotted guide for the pivoted member for upholding the pivoted member when not engaged by the high portion of the track.

50. In an apparatus for filling cans each provided with a filling perforation of a diameter to prevent spontaneous outflow of liquid therethrough from the can when the latter is inverted, liquid directing means movable into air tight relation to the perforated end of a can about said perforation, air exhaust means introducible into and removable from the can through the small perforation for producing sub-atmospheric conditions within the can to cause the flow of liquid thereinto, and means for causing withdrawal of the exhaust means from the can and the breaking of the air seal between the liquid conduit and the can about the perforation therein while sub-atmospheric conditions still exist within the can.

51. In a machine for filling cans, a relatively fixed can basket, a movable member working through the bottom of the can basket and provided with a conduit leading thereinto, said movable member carrying at its upper and lower ends compressible sealing devices, the sealing device at the lower end being more compressible than the one at the upper end, and a movable conduit carrying an air tube in position to pass through the movable member and sealing devices, the movement of said conduit effecting a movement of said member by engagement with the more compressible sealing device to cause the movement of the other sealing device into sealing engagement with a can placed upon the basket.

52. In a machine for filling cans, a supporting member, a rotatable spider carried thereby, pendent can baskets carried by the peripheral portion of the spider and each comprising spaced members separated to an extent greater than the length of the can to be supported, conduits for liquid to be filled into the cans each individual to a respective can basket and carried thereby, air exhaust tubes each individual to a can basket and positioned to be moved into and out of a can on the can basket, a suction chamber participating in the rotative movement of the spider, and conduits leading from the suction chamber and individual and connected to the air tubes.

53. In a machine for filling cans each through a small filling perforation in one end, a rotatable spider, can baskets thereon each adapted to receive a can in the inverted position and comprising can engaging members spaced apart a distance greater than the length of the can to be held, a conduit for liquid to be filled into the can carried by each can basket and provided with sealing means to engage the perforated end of an inverted can when on the basket, said conduit having a limited range of movement to bring its sealing means into engagement with the perforated end of the can about the perforation to clamp the can against that portion of the basket remote from the portion initially receiving the can, an air tube for each can basket of a diameter and length to enter the can through the small perforation into proximity with the imperforate end of the can and having a range of movement to permit its entire withdrawal from the can, said air tube moving through that portion of the conduit in sealing relation to the can, means movable into operative relation to the conduit to effect its movement into sealing relation to the can and also carrying the air tube, an air exhaust chamber participating in the rotative movement of the spider, and air exhaust connections from the exhaust chamber connected and individual to the air tubes.

54. In a machine for filling cans each through a small filling perforation in one end, a rotatable spider, can baskets thereon each adapted to receive a can in the inverted position and comprising can engaging members spaced apart a distance greater than the length of the can to be held, a conduit for liquid to be filled into the can carried by each can basket and provided with sealing means to engage the perforated end of an inverted can when on the basket, said conduit having a limited range of movement to bring its sealing means into engagement with the perforated end of the can about the perforation to clamp the can against that portion of the basket remote from the portion initially receiving the can, an air tube for each can basket of a diameter and length to enter the can through the small perforation into proximity with the imperforate end of the can and having a range of movement to permit its entire withdrawal from the can, said air tube moving through that portion of the conduit in sealing relation to the can, means movable into operative relation to the conduit to effect its movement into sealing relation to the can and also carrying the air tube, an air exhaust chamber participating in the rotative movement of the spider, and air exhaust connections from the exhaust chamber connected and individual to the air tubes, the machine being also provided with a reservoir for the material to be filled into the cans located at a lower level than the baskets for the cans.

55. In a machine for filling cans each through a small filling perforation in one end, a rotatable spider, can baskets pendent thereon and each adapted to receive a can in the inverted position and comprising can engaging members spaced apart a distance greater than the length of the can to be held, a conduit for liquid to be filled into the can carried by each can basket and provided with sealing means to engage the perforated end of an inverted can when on the basket, said conduit having a limited range of movement to bring its sealing means into engagement with the perforated end of the can about the perforation to clamp the can against that portion of the basket remote from the portion initially receiving the can, an air tube for each basket of a diameter and length to enter the can through the small perforation into proximity with the imperforate end of the can and having a range of movement to permit its entire withdrawal from the can, said air tube moving through that portion of the conduit in sealing relation to the can, means movable into operative relation to the conduit to effect its movement into sealing relation to the can and also carrying the air tube, an air exhaust chamber participating in the rotative movement of the spider, and air exhaust connections from the exhaust chamber connected and individual to the air tubes, the machine being also provided with a reservoir for the material to be filled into the cans located at a lower level than the baskets for the cans, and the exhaust chamber, conduits leading therefrom, and the air tubes connected to the conduits being constructed for the continuous maintenance of sub-atmospheric conditions therewith during the operation of the machine.

56. In a machine for filling cans each provided with a single small filling perforation at one end of a size to prevent spontaneous outflow of liquid therethrough when the can is inverted, a relatively fixed means for receiving a can in the inverted position, a relatively movable member associated with the can receiving means and carrying a sealing device for the perforated end of the can and operating to clamp the can to the can receiving means, and means for exhausting air from the can through the small perforation while the can is clamped and sealed.

57. In a machine for filling cans each with a small filling perforation in one end, means for holding the cans in an inverted position with the filling perforations downward, means for clamping the cans in the inverted position and sealing them about the perforations, means for directing material to the cans through the perforations, and means for exhausting air from the cans to cause the flow of material into said cans through the perforations, said air exhausting means being rendered active to withdraw air from the cans by the sealing of the cans about the perforations.

58. In a machine for filling cans while in the inverted position, each can being provided with a single small filling perforation at its then lower end, means for directing liquid to the perforation in each can and sealing the perforation against the entrance of air, air-suction means introducible into and removable from the can through the small perforation, and means for withdrawing the air suction means from the can and breaking the seal between the liquid directing means and the perforated end of the can.

59. In a machine for filling cans each provided with a single small filling perforation at one end of a size to prevent spontaneous outflow of liquid when the can is inverted, means for holding the can in the inverted position, a reservoir for the liquid to be filled into the can located at a lower level than the means for holding the can, a liquid conduit leading to the perforation in the can in air sealed relation thereto during the filling operation, and an air suction tube of a size and length to enter the inverted can to the filling level.

In testimony, that I claim the foregoing as my own, I have hereto affixed my signature in the presence of two witnesses.

WALTER J. PHELPS.

Witnesses:
   JOHN H. SIGGERS,
   D. R. WAGNER.